United States Patent
Bell

(10) Patent No.: US 6,725,983 B2
(45) Date of Patent: Apr. 27, 2004

(54) SHOCK ABSORBER WITH AIR PRESSURE ADJUSTABLE DAMPING

(75) Inventor: Stephen H. Bell, Guelph (CA)

(73) Assignee: Meritor Heavy Vehicle Technology, LLC, Troy, MI (US)

(*) Notice: Subject to any disclaimer, the term of this patent is extended or adjusted under 35 U.S.C. 154(b) by 57 days.

(21) Appl. No.: 09/953,479

(22) Filed: Sep. 14, 2001

(65) Prior Publication Data

US 2003/0052469 A1 Mar. 20, 2003

(51) Int. Cl.⁷ .................................................. F16F 9/06
(52) U.S. Cl. ...................... 188/269; 188/195; 188/297; 267/64.28
(58) Field of Search ............................... 188/195, 269, 188/297, 298; 267/64.15–64.21, 64.23–64.26, 64.28

(56) References Cited

U.S. PATENT DOCUMENTS

| | | | |
|---|---|---|---|
| 3,378,110 A | | 4/1968 | Parrish, Jr. |
| 4,534,580 A | * | 8/1985 | Kobayashi et al. ...... 267/64.24 |
| 4,660,689 A | * | 4/1987 | Hayashi et al. ............. 188/319 |
| 4,793,450 A | * | 12/1988 | Savenije ..................... 188/300 |
| 4,934,667 A | * | 6/1990 | Pees et al. ................ 267/64.21 |
| 5,097,929 A | * | 3/1992 | Spoto .......................... 188/319 |
| 5,180,144 A | * | 1/1993 | Hellyer et al. ........... 267/64.19 |
| 5,518,090 A | | 5/1996 | Miller et al. |
| 5,522,221 A | | 6/1996 | Kadlicko et al. |
| 5,542,509 A | | 8/1996 | Bell |
| 5,556,082 A | | 9/1996 | Takasaki |
| 5,572,425 A | | 11/1996 | Levitt et al. |
| 5,615,756 A | | 4/1997 | Grundei et al. |
| 5,725,239 A | | 3/1998 | de Molina |
| 5,810,128 A | | 9/1998 | Eriksson et al. |
| 5,860,498 A | | 1/1999 | Pradel |
| 5,862,895 A | | 1/1999 | Ricard |
| 5,934,422 A | | 8/1999 | Steed |
| 5,996,982 A | | 12/1999 | Bell |
| 6,015,155 A | | 1/2000 | Brookes et al. |
| 6,092,632 A | | 7/2000 | Popjoy et al. |
| 6,112,868 A | | 9/2000 | Graham et al. |
| 6,120,009 A | | 9/2000 | Gatehouse et al. |
| 6,155,391 A | | 12/2000 | Kashiwagi et al. |
| 6,164,665 A | | 12/2000 | Lentz et al. |
| 6,206,351 B1 | | 3/2001 | Hamada et al. |
| 6,213,262 B1 | | 4/2001 | Bell |
| 6,450,304 B1 | * | 9/2002 | Miller et al. ............. 188/266.5 |

FOREIGN PATENT DOCUMENTS

| | | |
|---|---|---|
| DE | 41 03 356 C1 | 6/1992 |
| EP | 0 565 832 A1 | 10/1993 |
| EP | 1 096 171 A2 | 5/2001 |

OTHER PUBLICATIONS

European Search Report mailed Jun. 6, 2003.

\* cited by examiner

Primary Examiner—Jack Lavinder
Assistant Examiner—Mariano Sy
(74) Attorney, Agent, or Firm—Carlson, Gaskey & Olds

(57) ABSTRACT

A vehicle suspension assembly includes a shock absorber that provides variable damping dependent on the load conditions of the vehicle. A central rod of the shock absorber includes a central bore that is fluidly coupled with air pressure within air springs of the suspension assembly. As the vehicle load increases and the pressure within the air springs increases, a damping adjustment assembly within the shock absorber increases the stiffness or damping of the shock absorber. In one example, a plunger moves within the central bore in the rod between a first position where less damping is provided and a second position where increased damping is achieved. A unique adapter member facilitates using a rod of appropriate size to achieve the desired air pressure conditions within the rod, while at the same time supporting conventional piston and disc valve components and providing enough material strength to withstand the tensile loads experienced under full extension. The adapter also includes a check valve to control fluid flow and provides a hydraulic cushion feature.

19 Claims, 3 Drawing Sheets

SHOCK ABSORBER WITH AIR PRESSURE ADJUSTABLE DAMPING

BACKGROUND OF THE INVENTION

In general terms, this invention relates to shock absorbers for vehicle suspensions. More particularly, this invention relates to a shock absorber that has adjustable damping based upon vehicle load.

Vehicle suspensions typically include shock absorbers for accommodating the variations in road surfaces that are encountered by a vehicle. The shock absorbers provide a more comfortable or consistent ride to the vehicle.

Many larger vehicles, such as trucks, also include air springs that have a chamber or bellows that is pressurized to provide an air cushion for the vehicle ride. While various combinations of shock absorber and air spring arrangements have been proposed, there is a need for improved ride control.

Various attempts have been made at providing variable suspension response by modifying the performance of shock absorbers or air springs depending on vehicle or road conditions. One shortcoming associated with many attempts is that additional components are added to provide additional functionality to the shock absorbers or air springs, for example. Such additional components introduce additional cost and complexity to the vehicle suspension. Moreover, vehicle packaging limitations render it difficult to add components onto existing structures.

For example, adjustable shock absorber assemblies have been proposed that include a separate chamber added onto a conventional shock absorber arrangement. The additional chamber then is coupled with a separate pressure source, such as an air source on the vehicle. The additional chamber renders it more difficult to place the shock absorber in a conventional position on a vehicle suspension. Additionally, there are further maintenance and other cost issues associated with such additional chambers.

There is a need for a shock absorber assembly that provides variable damping responsive to changes in the vehicle condition such as the amount of load on the vehicle. This invention provides a vehicle suspension with the ability to adapt to vehicle load conditions to provide variable damping or stiffness to ensure a more desirable or consistent ride while avoiding the shortcomings and drawbacks of prior attempts.

SUMMARY OF THE INVENTION

In general terms, this invention is a vehicle suspension assembly having a shock absorber with adjustable damping that changes responsive to changes in the vehicle load.

A vehicle suspension assembly designed according to this invention includes at least one air spring that is pressurized with air. At least one shock absorber has a central rod that moves in response to changing road conditions. The central rod includes a central bore that is coupled with the air supply to the air spring. Changes in pressure within the air spring result in changes in the damping level provided by the shock absorber.

In one example, a plunger is supported within the central bore of the rod and biased into a first position to provide a first damping condition. As air spring pressure increases, the plunger within the central bore is moved into a second position where increased shock absorber damping is provided. Because the pressure in the air spring increases with vehicle load, the shock absorber responsively provides increased damping. Therefore, a stiffer ride is provided under heavier vehicle load conditions, which results in a more consistent and desirable ride.

A significant advantage of this invention is that it allows for conventional shock absorber components to be used and does not require the addition of separate chambers or other complicated items to be added to a shock absorber. Additionally, this invention provides automatic damping adjustment responsive to the vehicle load.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
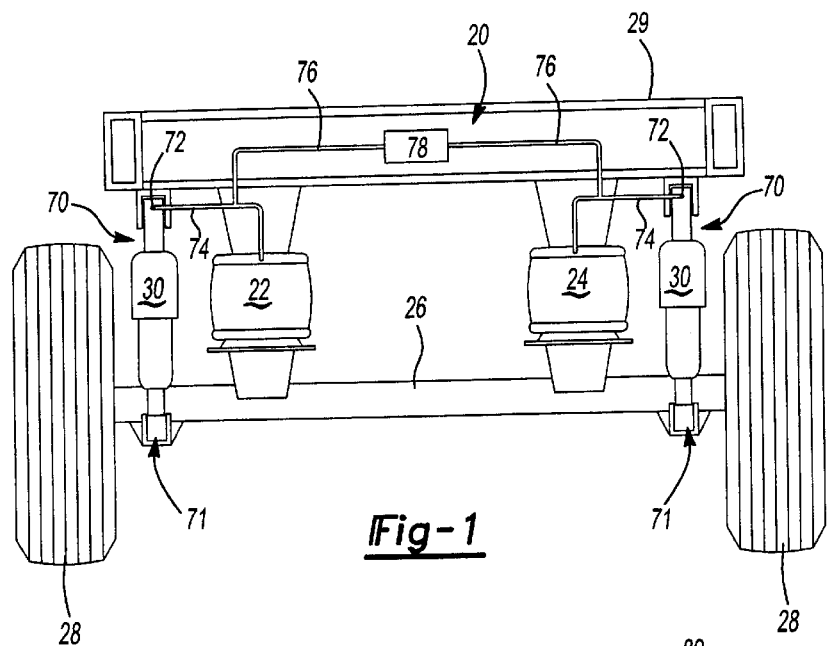
FIG. 1 schematically illustrates a vehicle suspension assembly designed according to this invention.
Figure 3A:
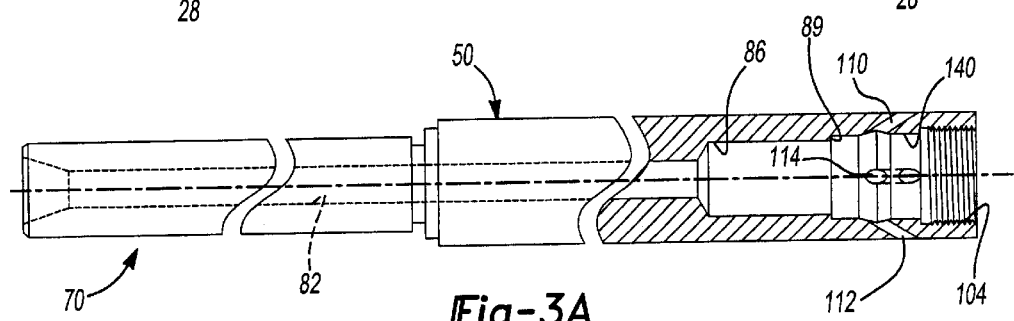
FIG. 3A illustrates an example central shock absorber rod designed according to this invention.
Figure 3B:
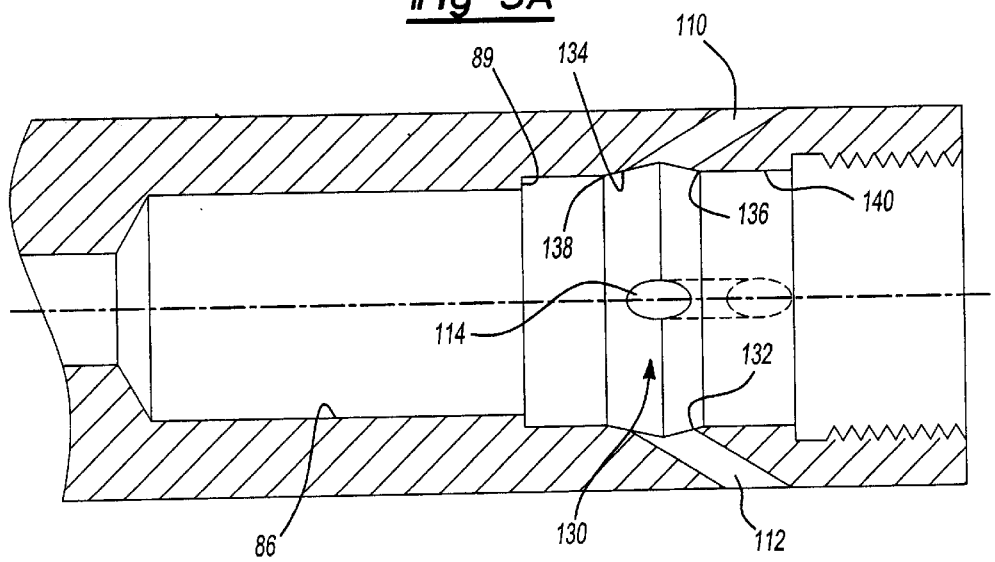
FIG. 3B illustrates, in somewhat more detail, selected features of the embodiment of FIG. 3A.
Figure 2:
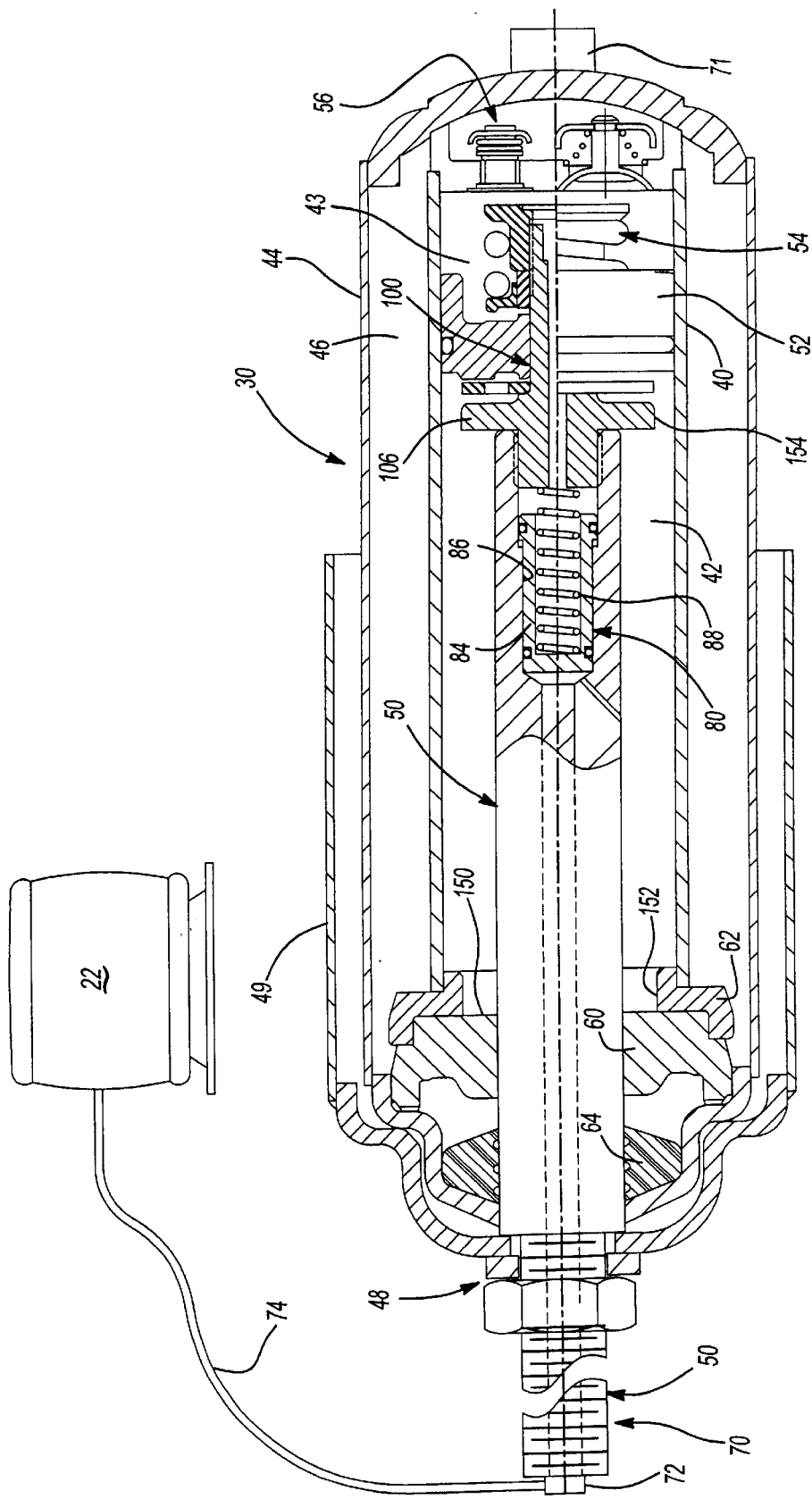
FIG. 2 is a partial cross-sectional view of a shock absorber designed according to this invention.
Figure 4:
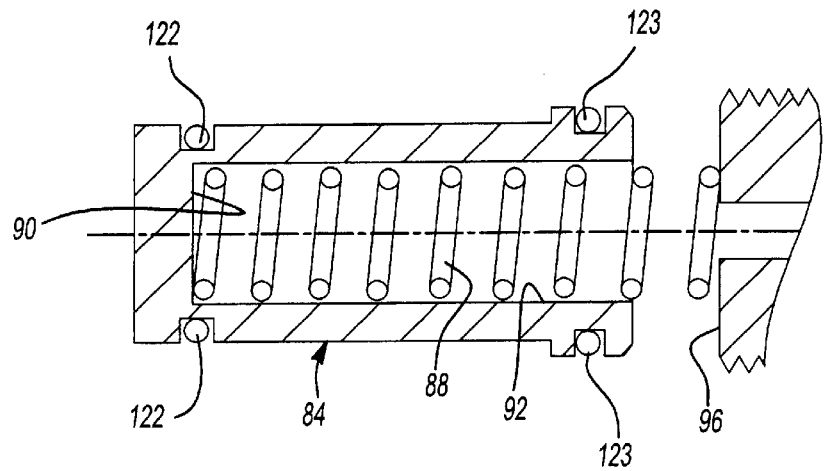
FIG. 4 illustrates a plunger designed according to this invention.
Figure 5:
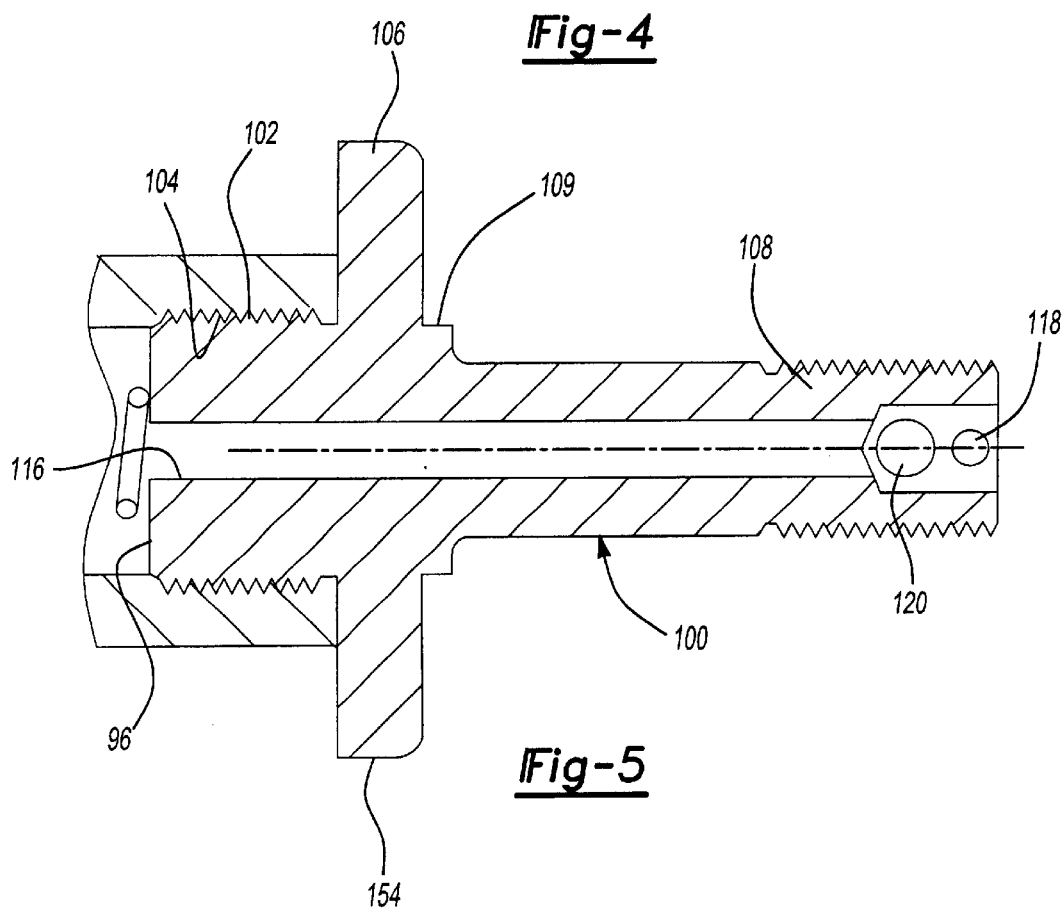
FIG. 5 illustrates a rod adapter designed according to this invention.

A vehicle suspension assembly 20 includes air springs 22 and 24 that are supported on a suspension arrangement 26 in a conventional manner. The air springs 22 and 24 are pressurized with air in a known manner. Shock absorbers 30 provide further damping to absorb relative movement between the vehicle wheels 28 and the vehicle body structure 29.

Each of the shock absorbers preferably has the ability to provide adjustable damping responsive to changes in the load on the vehicle.

Each shock absorber 30 includes an inner cylinder 40 that effectively forms a recoil chamber 42 and a compression chamber 43 both containing hydraulic fluid. An outer cylinder 44 defines a reservoir chamber 46 between the inner cylinder 40 and the outer cylinder 44. One end 48 of the shock absorber 30 includes a dust cover 49 that protects a central rod 50 from road debris and prevents contaminants from getting into the recoil chamber 42 or reservoir chamber 46 of the shock absorber.

The central rod 50 extends at least partially into the inner cylinder 40. The rod 50 moves relative to the cylinders 40 and 44 when the vehicle wheels 28 move relative to the vehicle body structure. A piston 52 and conventional disc valve arrangement 54 are supported at one end of the rod 50 and move with the rod. The piston 52 effectively divides the inner cylinder 40 into the recoil chamber 42 and the compression chamber 43 and allows fluid flow between the chambers 42 and 43 across the piston as known. Movement of the rod, piston and disc valve arrangement is damped by the presence of the fluid within the chambers 42, 43 and 46. The piston 52, disc valve arrangement 54 and a conventional flow metering device 56 operate in a known manner to control the amount of fluid flow within and between the chambers 42, 43 and 46, which provides damping.

An inner cylinder head 60 and a cylinder adapter 62 close off one end of the recoil chamber 42 and the reservoir chamber 46. A rod seal 64 ensures that no fluid leaks out from the shock absorber 30.

An outer most end 70 of the rod 50 preferably is connected with the vehicle body structure while an opposite end 71 of the shock absorber preferably is connected with an appropriate portion of the wheel axle assembly (i.e., the unsprung mass).

An air inlet coupling 72 is secured to the end 70 of the rod 50. An air hose or conduit 74 couples the air inlet 72 with an air supply 76 that couples an air pressure source 78 with the air springs 22 and 24.

The shock absorber 30 includes a damping adjustment arrangement 80 that operates responsive to changes in the air pressure within the air springs 22 or 24 to adjust the damping provided by the shock absorber 30. As will become apparent from the following description, the damping adjustment arrangement 80 provides increased damping or greater stiffness in the shock absorber 30 responsive to increasing pressure in the air bags 22 or 24. This provides an arrangement where an increased load on the vehicle, which results in increased pressure in the air springs, provides increased damping from the shock absorbers 30.

The damping adjustment arrangement 80 provides an adjustable, parallel flow path to that provided across the piston 52. As will be described, controlled amounts of fluid are permitted to pass through a parallel flow path at least partially through the central rod 50 under selectable conditions.

The rod 50 preferably includes a central bore 82 that extends through the rod. The air inlet 72 couples the central bore 82 with the air supply conduit 74 so that air pressure exists within the central bore 82. The air pressure inside of the bore 82 corresponds to the amount of air pressure within the air springs. A plunger 84 is received and supported within an enlarged diameter portion 86 of the central bore 82. A spring 88 preferably biases the plunger 84 into a first position against a shoulder 89 inside the enlarged portion 86. The spring 88 preferably has one end received against a surface 90 at the end of a central bore 92 through the plunger 84. The spring 88 preferably is at least partially received within the central bore 92. An opposite end of the spring 88 preferably rests against a surface 96 on an adapter member 100.

A threaded portion 102 of the adapter member 100 preferably is received within a threaded end 104 of the central bore 82 inside of the rod 50. A flange portion 106 on the adapter member 100 preferably is longitudinally adjacent the threaded portion 102. In the illustrated example, the flange 106 is received against an adjacent surface on the rod 50.

The adapter member 100 preferably also includes a support portion 108 that supports the piston 52 and disc valve arrangement 54. The support portion 108 preferably has a nominal outside diameter that is smaller than the outsider dimension of the flange 106 or the threaded portion 102 of the adapter member 100. The support portion 108 preferably is sized to appropriately support the piston 52 and disc valve assembly 54 in a manner that the piston 52 and disc valve assembly 54 can be conventional, commercially available components.

The adapter member 100 preferably includes an increased radial shoulder 109 that has an outside dimension that is greater than the nominal dimension of the support portion 108 but smaller than an outside dimension of the flange 106. In the illustrated example, the shoulder 109 ensures that the piston 52 and disc valve assembly 54 do not directly contact the flange portion 106 to allow oil flow across the piston 52 and through the valve assembly 54.

A significant advantage to including an adapter member 100 that is designed according to this invention is that a cost savings is presented by utilizing conventional pistons 52 and disc valve assemblies 54 with a standard inside diameter through hole. The adapter member 100, at the same time, permits the rod 50 to have appropriate dimensions that allows housing the plunger 84 and provides sufficient air pressure force within the central bore 82 and the enlarged area 86 to overcome friction between the components that would otherwise interfere with desired plunger movement so that adjustable damping is achieved as will be described. Having sufficient air pressure force also allows the plunger 84 to displace any fluid from its path. Other advantages and features of the adapter member 100 will be described below.

The rod 50 preferably includes a plurality of openings that extend from the central bore through an outer surface on the rod. Several openings are illustrated at 110, 112 and 114. While only three openings are visible in the drawings, it is preferred to have four such openings equally spaced about the circumference of the rod 50. It is most preferred to have the openings 110, 112 and 114 set at an angle relative to the central axis of the rod 50. The illustrated example includes an angle of approximately 30 degrees. The angled arrangement permits fluid communication as needed for adjustable damping while at the same time maintaining component sizes such that appropriate dead length is achieved during operation of the shock absorber 30. As known in the art, it is desirable to minimize the dead length and to optimize the packaging of a shock absorber. The angled position of the openings 110, 112 and 114 permits such packaging.

When the plunger 84 is biased into the first position, the openings 110, 112 and 114 are not blocked and fluid flow is possible from the recoil chamber 42 into the enlarged portion 86 of the central bore 82 and through a central opening 116 through the adapter member 100 and into the compression chamber 43. This is an adjustable, parallel pathway for fluid to exit the recoil chamber 42 and enter the compression chamber 43. A roll pin 118 maintains a valve ball 120 within one end of the adapter member 100. The valve ball 120 is operative to allow fluid flow in a direction out of the recoil chamber 42 during an extension stroke, for example. The valve ball 120 prevents fluid from reentering the recoil chamber on a compression stroke, for example. Accordingly, the adapter member 100 permits additional fluid flow between the recoil chamber 42 and the compression chamber 43 only when desired and in a single direction.

An O ring, 122 preferably is supported on the plunger 84 to prevent any fluid flow back into the central bore 82 beyond the position of the plunger 84 regardless of the position of the plunger 84.

Another O ring 123 is supported near an opposite end of the plunger 84 to prevent fluid from exiting the recoil chamber 42 past the forward end of the plunger 84 into the enlarged area 86 of the rod 50 when the plunger 84 is in a forward ("second") position to block the passages 110, 112 and 114. The O ring 123 effectively prevents the fluid pressure from undesirably moving the plunger 84 back to the first position.

Although the illustrated example includes O rings 122 and 123, other sealing arrangements may be employed to ensure that the fluid from the inside of the shock absorber does not mix with the air in the remaining portion of the central bore 82 inside the rod 50 or from interfering with desired plunger operation. The sealing arrangement prevents any fluid from the shock absorber from entering the conduits 74 or 76, which provide air pressure to the air springs and the adjustable damping arrangement.

As the vehicle load increases, pressure within the air springs increases. This increased pressure also results in an increased pressure inside the central bore 82. As the pressure becomes great enough to overcome the bias of the spring 88, the plunger 84 is moved from the first position toward a second position where the plunger 84 eventually blocks off the openings 110, 112 and 114. In this second position, no more fluid flow is permitted through the opening 116 in the middle of the adapter member 100. Without such fluid flow, the shock absorber provides increased damping or increased stiffness. Accordingly, increased pressure in the air springs caused by increased vehicle load results in increased damping from the shock absorber 30. Therefore, this invention provides a vehicle suspension arrangement where variable damping is provided based upon variations in vehicle load. This is especially advantageous because under lighter vehicle load conditions, less stiffness is desired while under heavier vehicle load conditions greater stiffness is required to achieve a desired ride.

The enlarged portion 86 of the central bore 82 preferably includes an increased diameter section 130 at the longitudinal point where the openings 110, 112 and 114 enter the central bore 82. The illustrated example includes angled surfaces 132 and 134 adjacent the point where the openings extend into the central bore. The edges 136 and 138 of the angled surfaces preferably are chamfered. Having the enlarged diameter section 130 and the chamfered edges 136 and 138 ensure that the O ring 123 is not damaged as the plunger 84 moves within the enlarged portion 86 of the central bore 82. The illustrated example includes a surface portion 140 against which the O ring 123 seals when the plunger 84 is fully into the first position where the openings 110, 112 and 114 are blocked. In one example, the surface 140 has a longitudinal dimension of 0.175 inches. A distance between the center of the openings 110, 112 and 114 and the end of the rod 50 is 0.482 inches. This distance is the largest preferred distance to avoid rod seal damage upon full extension of the rod. Having the openings 110, 112 and 114 at the 30° angle makes it possible to maintain the 0.482 inch dimension while allowing a sufficient dimension of the surface 140 to provide an adequate seal when the O-ring 123 is received against the surface 140. The angled position of the openings, therefore, allows appropriate dimensional sizes to achieve shock absorber operation without increasing the dead length of the assembly.

The ball valve 120 ensures that additional fluid pressure upon a compression stroke does not flow through the opening 116 in the adapter member 100 to combine with the bias of the spring 88, which may otherwise overcome the air pressure in the central bore 82, depending on the circumstances. Therefore, the adapter member 100 includes a unique feature for controlling fluid flow within the shock absorber to ensure the desired amount of damping on compression and extension.

Another feature of a shock absorber designed according to this invention provides an effective static extension tensile limiting stop. The adapter member 100 includes the flange 106 to provide a great enough surface area to withstand the tensile loads when the shock absorber is at full extension. The inner cylinder head 60 includes a stop surface 150 against which the flange 106 abuts when the rod 50 is fully extended out of the shock absorber. The cylinder adapter 62 preferably includes an inside diameter on a surface 152 that is slightly larger than an outside diameter on the outer most surface 154 of the flange portion 106 of the adapter 100. In one example, a clearance of approximately 0.004 inches is provided between the surfaces 152 and 154. The clearance between the flange portion 106 and the surface 152 ensures that no fluid will be trapped between the flange 106 and the inner cylinder head 60 stop surface 150.

The radial clearance between surfaces 152 and 154 provides a hydraulic cushion upon dynamic full extension of the shock absorber. As known, hydraulic cushions provide the benefit of minimizing shock component fatigue under repeated load conditions on air spring suspensions where the shock can be taken repeatedly to its fill extension. The inventive arrangement provides a hydraulic cushion feature in a new manner.

Because the adapter member 100 is potentially subjected to significant dynamic tensile loads from damping and the hydraulic cushion in extension and static tensile loads when the shock absorber is fully extended, it is most preferred that the adapter member 100 be made from a high strength steel material. In one example, the material used for forming the adapter member 100 is an SAE 4130/4140 through hardened to 25–36 RC steel. The rod 50 may be made from any suitable steel material. In one example, stainless steel is used.

The coupling between the end 70 of the shock absorber 30 and the vehicle body structure can be accomplished in a variety of ways. It is most preferred to permit the air inlet 72 to be coupled with the distal end of the rod 50. One example arrangement includes a stud type end mount for the rod 50. In one example the stud is machined onto the rod 50 at the end 70. An appropriately sized washer and bushing are then slid onto the stud. The stud end is then slid into a hole in the vehicle frame or mounting bracket. A second bushing is slid onto the end of the stud and a second washer is slid on over the bushing. A nut or other fastener is installed onto the stud to compress the washers, bushings and the appropriate portion of the frame or mounting bracket together with the frame or mounting bracket sandwiched between the two bushings.

With such an arrangement the open end of the rod 50 is still exposed after assembly and the air inlet fitting 72 can be fitted to the end 70 of the rod. One example includes a standard ⅛ inch NPT air fitting that is threaded into the opening 82 in the end of the rod 50. The conduit 74 can be a plastic air hose of the appropriate size to couple the fitting 72 to the air supply for the air springs. A suitable T-fitting can be used to couple the conduit 74 with the air supply line.

A conventional height leveling valve preferably controls the amount of air pressure put into the air springs. When the load on the vehicle increases, more air pressure is required in the bellows or bag portion of the air springs to keep the height leveling valve in a neutral position. Therefore, higher air pressure is provided inside of the central bore 82 in the rod 50. When the pressure becomes great enough to overcome the bias of the spring 88, the plunger 84 moves into a high damping setting position. As the load on the vehicle decreases, the air pressure in the air springs decreases in a conventional manner and the height leveling valve is returned to a neutral position. At the same time, the lowered air pressure is experienced within the central bore 82 in the rod 50 such that the spring 88 is able to move the plunger 84 back into the first position so that the shock absorber is less stiff or provides less damping.

Accordingly, a shock absorber and vehicle suspension assembly designed according to this invention keeps a vehicle from being over damped under light load conditions while automatically increasing damping for heavier load conditions to prevent under damping.

The preceding description is exemplary rather than limiting in nature. Variations and modifications to the disclosed example may become apparent to those skilled in the art that do not necessarily depart from the essence of this invention. The scope of legal protection given to this invention can only be determined by studying the following claims.

I claim:

1. A vehicle suspension system, comprising:

at least one suspension air bag that is pressurized;

at least one shock absorber having a rod that moves axially within the shock absorber, the rod having an open end and a central bore that extends from the open end and is coupled with the air bag near an opposite end of the rod such that changes in pressure in the air bag result in an adjustment of a stiffness of the shock absorber;

the shock absorber includes a damping adjuster within the central bore of the rod and wherein changes in the pressure in the air bag cause movement of the damping adjuster within the rod;

the damping adjuster includes a plunger that is biased into a first position corresponding to a low shock absorber stiffness and wherein increases in the pressure within the air bag moves the plunger against the bias toward a second position corresponding to a higher shock absorber stiffness; and at least one fluid passageway formed in the rod to allow fluid flow from the shock absorber into a portion of the central bore of the rod on an opposite side of the plunger from the airbag pressure anti air of the open end of the central bore, the fluid passageway extending from the central bore through an outer surface on the rod at an angle relative to the central axis of the rod.

2. The suspension system of claim 1, including at least one fluid passageway formed in the rod to allow fluid flow into a portion of the central bore and wherein the first position of the plunger leaves the fluid passageway open and the second position corresponds to at least partially blocking the fluid passageway.

3. The suspension system 1, wherein the angle is oblique to an axis of the rod.

4. The suspension system of claim 1, including a spring that biases the plunger into the first position.

5. The suspension system of claim 1, including an adapter at the rod open end, the adapter permitting fluid flow through the open end in only one direction.

6. A vehicle suspension system, comprising:

at least one suspension air bag that is pressurized;

at least one shock absorber having a rod that moves axially within the shock absorber, the rod having a central bore that is coupled with the air bag such that changes in pressure in the air bag result in an adjustment of a stiffness of the shock absorber;

an adapter member attached to an end of the rod that is opposite the coupling with the air bag, the adapter member having a nominal outside dimension on a first portion that extends away from the rod in an axial direction, a flange adjacent the first portion and a second portion that is at least partially received within the rod, the rod having an outside dimension that is greater than the nominal dimension, wherein the shock absorber includes an inner cylinder, an outer cylinder and a sealing arrangement between the two cylinders at one end of the inner cylinder, the sealing arrangement including a stop surface against which the flange on the adapter member is received when the rod is in a fully extended position.

7. The suspension system of claim 6, including a disc valve device supported on the first portion of the adapter member.

8. The suspension system of claim 6, wherein the sealing arrangement includes a radial shoulder on a cylinder adapter and wherein the radial shoulder has an inside radial dimension that is slightly larger than an outside radial dimension on the flange of the adapter member such that as the flange moves into contact with the stop surface, there is a clearance between the flange and the radial shoulder.

9. A vehicle suspension system, comprising:

at least one suspension air bag that is pressurized;

at least one shock absorber having a rod that moves axially within the shock absorber, the rod having a central bore that is coupled with the air bag such that changes in pressure in the air bag result in an adjustment of a stiffness of the shock absorber; and an adapter member attached to an end of the rod that is opposite the coupling with the air bag, the adapter member having a nominal outside dimension on a first portion that extends away from the rod in an axial direction, a flange adjacent the first portion and a second portion that is at least partially received within the rod, the rod having an outside dimension that is greater than the nominal dimension, wherein the adapter member includes an axial bore and a valve member near an end of the bore distal from the rod, the valve member permitting fluid flow through the adapter member bore in only one direction.

10. The suspension system of claim 9, wherein the valve member is operative to prevent fluid pressure within the shock absorber from overcoming the pressure in the rod from the air bag.

11. A shock absorber device, comprising:

a first cylinder;

a second cylinder at least partially surrounding the first cylinder;

a piston that divides the first cylinder into first and second chambers, the piston allowing a selected amount of fluid transfer between the first and second chambers;

a rod supporting the piston, the rod and piston being moveable within the first cylinder to cause fluid transfer between the first and second chambers, the rod having an open end and a central bore within the rod that extends from the open end and that is adapted to be coupled to an air pressure source near an opposite end of the rod, the rod including a plurality of openings in the rod between an outer surface of the rod and a portion of the central bore that are selectively blocked responsive to changes in air pressure within the central bore in the rod to provide adjustable damping by altering the amount of fluid flow between the first and second chambers through the openings and the rod open end upon movement of the piston, and wherein the openings are positioned at an angle relative to a central axis of the rod.

12. The device of claim 11, wherein the fluid openings in the rod provide an adjustable flow path for fluid to flow between the first and second chambers that is parallel to a primary flow path across the piston.

13. The device of claim 11, including a damping adjuster within the central bore of the rod and wherein changes in the air pressure within the central bore cause movement of the damping adjuster within the central bore.

14. The device of claim 13, wherein the damping adjuster includes a plunger that is biased into a first position corresponding to a low shock absorber stiffness and wherein increases in air pressure within the central bore moves the plunger against the bias toward a second position corresponding to a higher shock absorber stiffness.

15. The device of claim 11, including an adapter at the rod open end, the adapter permitting fluid flow through the open end in only one direction.

16. A shock absorber device, comprising:
   a first cylinder;
   a second cylinder at least partially surrounding the first cylinder;
   a piston that divides the first cylinder into first and second chambers;
   a rod supporting the piston, the rod and piston being moveable within the first cylinder to cause fluid transfer between the first and second chambers, the rod having a central bore within the rod that is adapted to be coupled to an air pressure source, the rod including at least one fluid opening that is selectively blocked responsive to changes in air pressure within the central bore in the rod to provide adjustable damping by altering the amount of fluid flow between the first and second chambers upon movement of the piston;
   an adapter member attached to an end of the rod near the piston, the adapter member having a nominal outside dimension on a first portion that extends away from the rod in an axial direction, a flange adjacent to first portion and a second portion that is at least partially received within the rod, the rod having an outside dimension that is greater than the nominal dimension, including a sealing arrangement between the first and second cylinders at one end of the first cylinder, the sealing arrangement including a stop surface against which the flange on the adapter member is received when the rod is in a fully extended position.

17. The device of claim 16, wherein the sealing arrangement includes a radial shoulder that has an inside radial dimension that is slightly larger than an outside radial dimension on the flange of the adapter member such that as the flange moves into contact with the stop surface, there is a clearance between the flange and the radial shoulder which provides a dynamic hydraulic cushion.

18. The device of claim 16, wherein the flange and the stop surface cooperate to provide a static tensile stop.

19. A shock absorber device, comprising:
   a first cylinder;
   a second cylinder at least partially surrounding the first cylinder;
   a piston that divides the first cylinder into first and second chambers;
   a rod supporting the piston, the rod and piston being moveable within the first cylinder to cause fluid transfer between the first and second chambers, the rod having a central bore within the rod that is adapted to be coupled to an air pressure source, the rod including at least one fluid opening that is selectively blocked responsive to changes in air pressure within the central bore in the rod to provide adjustable damping by altering the amount of fluid flow between the first and second chambers upon movement of the piston;
   an adapter member attached to an end of the rod near the piston, the adapter member having a nominal outside dimension on a first portion that extends away from the rod in an axial direction, a flange adjacent to first portion and a second portion that is at least partially received within the rod, the rod having an outside dimension that is greater than the nominal dimension wherein the adapter member includes an axial bore and a valve member at an end of the bore distal from the rod, the valve member permitting fluid flow through the adapter member bore in only one direction.

* * * * *

UNITED STATES PATENT AND TRADEMARK OFFICE
CERTIFICATE OF CORRECTION

PATENT NO. : 6,725,983 B2
DATED : April 27, 2004
INVENTOR(S) : Bell

It is certified that error appears in the above-identified patent and that said Letters Patent is hereby corrected as shown below:

Column 7,
Line 35, "anti-air" should read as -- and out --

Signed and Sealed this

Twenty-ninth Day of June, 2004

JON W. DUDAS
*Acting Director of the United States Patent and Trademark Office*